Patented Sept. 7, 1948

2,448,520

UNITED STATES PATENT OFFICE 2,448,520

ESTERS

Martin E. Cupery, Wilmington, Del., assignor to E. I. du Pont de Nemours & Company, Wilmington, Del., a corporation of Delaware No Drawing. Application November 16, 1943, Serial No. 510,487

14 Claims. (Cl. 260—410.8)

This invention relates to new synthetic drying oils and to coating compositions containing them.

The higher grade natural drying oils, such as China-wood oil and oiticica oil, are subject to wide variations in price, availability, and even in quality. Furthermore, these oils are not produced in this country in substantial amounts. It has therefore been desirable to develop synthetic compositions to replace or improve on these natural drying oils.

Thus, this invention has as its general objective the preparation of new esters which can be substituted for the rapidly drying natural fatty oils in coating compositions into which fatty oils are now normally formulated, preferably to obtain improved properties.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acid or acids which will give esters having such properties.

A still further objective is the preparation of esters from those monocarboxylic acids which have the particular type of unsaturation, and other elements of chemical structure, which will impart rapid drying properties to said esters.

An additional objective is the provision of methods of making these new esters.

The above and other objects appearing hereinafter are accomplished by preparing, for example, by one of the methods subsequently described in detail, a polyhydric alcohol ester of an unsaturated benzoic acid, as defined herein, or a polyhydric alcohol mixed ester of an unsaturated benzoic acid, as defined herein, and at least one monocarboxylic acid. The latter acids are preferably unsaturated, those derived from natural drying or semi-drying oils being most useful.

The expression "unsaturated benzoic acid" is used in a generic sense to mean a benzoic acid in which the benzoic acid residue is attached directly (as in p-vinylbenzoic acid), or through an intervening carbonyl radical (as in p-crotonylbenzoic acid), to an ethylenically bonded carbon atom.

The novel properties of the products of the invention are considered to flow from the particular arrangement of aromatic ring and substituted ethylenic group, or the particular sequence of aromatic ring, carbonyl group and substituted ethylenic group.

Polyhydric alcohol esters of unsaturated benzoic acids can be prepared by reacting a polyhydric alcohol directly with the acid, or esterifiable derivative thereof. The esterification can be carried out by any suitable method which may be selected from the methods well known in the art. Mixed esters can be prepared by reacting two or more of the unsaturated benzoic acids, or esterifiable derivatives thereof, with a polyhydric alcohol or alcohols, or by reacting one or more of the unsaturated benzoic acids, or esterifiable derivatives thereof, and at least one monocarboxylic acid, or esterifiable derivative thereof, with a polyhydric alcohol or alcohols. These mixed esters can be prepared in one or more steps, depending upon the availability of the ingredients and the convenience in operating the process.

More specifically, in one of the preferred methods of carrying out the invention, the unsaturated benzoic acid, such as p-cinnamoylbenzoic acid, is reacted with a polyhydric alcohol which has been partially esterified with a different acid or acids. When the polyhydric alcohol partial esters are glycerol partial esters of long chain fatty acids, they are most suitably obtained by heating fatty oils in the usual way with glycerol and, preferably, an ester-interchange catalyst. In carrying out this alcoholysis step, the oil and free polyhydric alcohol, in proportions calculated to give the degree of alcoholysis desired, are placed, along with a small amount of alcoholysis catalyst (e. g., 0.01-1.0% litharge based on the oil), in a reactor fitted with an agitator, a device to measure the temperature, and a gas inlet. The mixture is then heated with stirring for 1 to 2 hours at about 200-250° C., an oxygen-free inert gas, such as carbon dioxide or nitrogen, being passed into and over the mixture. In the esterification step, this polyhydric alcohol partial ester is usually cooled to about 140-150° C., and the unsaturated benzoic acid, or esterifiable derivative thereof, is introduced in approximately the amount sufficient to esterify the free hydroxyl groups calculated to be present from the initial proportions of oil and polyhydric alcohol. A hydrocarbon solvent, such as xylene or toluene, is next added in an amount sufficient to produce boiling when the temperature reaches about 200° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the amount and nature of the solvent employed, the reaction is usually completed within 4-15 hours; thus, when the temperature is around 200° C., the process is usually completed within about 4-10 hours. The reaction can be accelerated, if desired, by means of esterification catalysts, such as sodium bisulfate. The progress of the reaction can be followed by acid number determinations, the heating being stopped when the acid number reaches or approaches constancy or at the desired value. There is obtained a viscous solution of the new drying oil from which the solvent can be removed, if desired, by distillation or by forcing a rapid stream of carbon dioxide through the mixture.

Another preferred method for preparing the polyhydric alcohol mixed esters of this invention involves the simultaneous reaction of a polyhydric alcohol, a polyhydric alcohol ester such as a drying or semi-drying oil, and sufficient unsaturated benzoic acid to esterify the free hydroxyl groups present in this mixture. These ingredients undergo simultaneous esterification and ester interchange, using the conditions described above for the esterification of a glycerol partial ester with the unsaturated benzoic acid.

Similarly, a polyhydric alcohol ester of only the unsaturated benzoic acid, for example, the glycerol ester of p-cinnamoylbenzoic acid, can be made by direct esterification of glycerol with the acid under the conditions as described above.

Simple or mixed esters can also be prepared by an ester interchange process. Such a process usually involves an ester interchange between a simple ester of the unsaturated benzoic acid with a low molecular weight monohydric alcohol, and a polyhydric alcohol or a partial ester of a polyhydric alcohol. In general, the ester interchange proceeds at temperatures of 150–300° C. during 3–20 hours when employing catalytic amounts of such catalysts as litharge or sodium hydroxide. For example, an ester interchange between methyl-p-cinnamoylbenzoate and linseed oil monoglyceride will readily take place with evolution of methanol when these two reactants are heated at 200–225° C. in the presence of 0.1% litharge catalyst.

An effect which approaches or equals the behavior of the mixed ester obtained as described above can also be obtained by preparing a mixed ester having a higher content of the unsaturated benzoic acid ester than desired and blending it with that amount of drying oil, or other ester whose acids are being used, which is calculated to give a mixed ester of the desired proportions. Suitable conditions for blending are, for example, the heating of the two oils with stirring, in an inert atmosphere, for about 0.5 hour at about 200° C.

The polyhydric alcohol esters described above are oils or solids having drying properties. These can be formulated, by conventional methods used with natural drying oils, into various coating compositions. Blending of these new oils with natural drying or semi-drying oils also gives coating composition vehicles of unique properties.

In preparing the esters of the present invention, certain precautions are often necessary in order to obtain satisfactory results from a number of standpoints. The esterification reaction for the preparation of the drying oil is preferably carried out at as low a temperature as is practical. Another such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered.

To obtain light-colored products, it is also necessary to avoid the use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is mentioned, sufficient of a 2% cobalt naphthenate solution has been used to give the indicated content of cobalt metal, this proportion being based on oil.

The ester compositions in the titles of each example do not mean that the product actually contains the stated percentages of triglycerides, but are instead an index to the proportion of monocarboxylic acid radicals in the product. To illustrate, a product referred to as having 30% of unsaturated benzoic acid triglyceride and 70% of linseed acids glyceride is a product prepared from proportions of reactants so chosen as to yield theoretically a mixture of these two glycerides in the stated proportions by weight, i. e., if it be assumed no mixed ester is formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are probably present.

EXAMPLE 1

*Glycerol mixed ester of linseed oil acids and p-cinnamoylbenzoic acid*

| | Per cent |
|---|---|
| p-Cinnamoylbenzoic acid triglyceride | 31.2 |
| Linseed acids glyceride | 68.8 | p-Cinnamoylbenzoic acid, 8 parts, 18 parts of linseed oil diglyceride, 0.03 part of sodium acid sulfate, and enough toluene to cause refluxing of the mixture at 200° C., are charged into an apparatus equipped with a reflux condenser to which is attached a water separating device, an agitator, a temperature measuring device, and a gas inlet tube. The condenser allows the condensation of the toluene and water of esterification, separation of the water, and return of the toluene to the reaction vessel. After heating the mixture at reflux in an inert atmosphere of nitrogen for 4.5 hours at 200° C., a vigorous current of inert gas is blown through the reaction mixture at this temperature for about 20 minutes to remove the solvent and last traces of unreacted acid. The resulting homogeneous oil is cooled and filtered, after which a typical product has the following physical and analytical values: $N_D^{25}$ 1.5160; hydroxyl number 16.46; acid number 0.75; viscosity P; color 9.0.

Thin films of this oil containing 0.03% cobalt dry over steel or wood substrates to give a hard, light-colored, and tack-free coating after drying for about 10 hours at room temperature. Unmodified linseed oil under the same conditions is tacky and eventually (after several days) dries to a soft, weak film having residual tackiness.

The p-cinnamoylbenzoic acid used in the above preparation is prepared by reacting p-acetobenzoic acid wtih benzaldehyde, according to the method of Feist (Annalen der chemie, vol. 496, pp. 99-122, published in 1932). The product prepared by the above procedure can be converted into oils of high viscosity by heating for a suitable period in an inert atmosphere at 250-300° C. The resulting viscous oils can be further heated with suitable resins, such as rosin, ester gum, phenol-aldehyde resins, or various varnish gums, to give varnishes which have excellent color, viscosity, and drying characteristics. Films of such varnishes dry rapidly and are similar in hardness to films obtained from perilla oil varnishes of comparable oil length.

The above-mentioned oil, unmodified or bodied, or compositions based on this oil, can be used in the formulation of enamels and paints. Various pigments, extenders, colors, fillers, and driers can be used in these compositions according to procedures well known in the art. Such pigmented compositions dry more rapidly, have greater hardness, and show better resistance to dirt collection than similar compositions based on linseed oil or soya oil.

EXAMPLE 2

*Glycerol mixed ester of linseed oil acids and p-[β-(2-furyl)acrylyl]benzoic acid*

| | Per cent |
|---|---|
| p-[β-(2-furyl)acrylyl]benzoic acid triglyceride | 30.3 |
| Linseed acids glyceride | 69.7 |

Into a reaction vessel fitted with a reflux condenser, to which is attached a water-separating device, an agitator, a temperature recorder, and a gas inlet tube, is charged 30 parts of linseed oil diglyceride, 12 parts of p-[β-(2-furyl)acrylyl]benzoic acid, 0.04 part sodium acid sulfate, and enough toluene to insure refluxing of the vapors into the condenser when the mixture is heated at about 200° C. The condenser is designed so as to allow the condensation of toluene and the water of esterification, the separation of the water, and return of the toluene to the reaction vessel. An inert atmosphere of deoxidized nitrogen is maintained within the reaction vessel throughout the esterification. After refluxing the mixture at 200° C. for 4.25 hours, a vigorous stream of inert gas is blown through it and the excess toluene is completely distilled off. The product is cooled and filtered. A representative product is found to possess the following physical and analytical values: $N_D^{25}$ 1.5289; hydroxyl number 5.34; acid number 4.59; viscosity Y; color, slightly above 10.

The p-[β-(2-furyl)acrylyl]benzoic acid used in the above process is prepared by reacting sodium p-acetobenzoate, in dilute alkaline solution, with furfural. Analysis shows that it contains 69.12% carbon and 3.97% hydrogen, and has a neutral equivalent of 240 and a melting point of 221° C.

The mixed ester, described above, can be bodied to high viscosity by heating at 250-300° C. It may be used for the preparation of varnishes or the formulation of enamels and paints as described in Example 1. Thin films of the unmodified ester containing 0.03% cobalt and flowed over steel or wood substrates dry to hard, tack-free coatings in about 36 hours at room temperature. Unmodified linseed oil under the same drying conditions remains tacky and eventually (after several days) dries to a soft, weak film having considerable residual tackiness.

The simple esters of this invention can be prepared by reacting the polyhydric alcohols with any benzoic acid which has suitable unsaturated substituents, or with any appropriate esterifiable derivative thereof, such as the anhydried, acid halide, or esters with an alcohol more volatile than the polyhydric alcohol whose ester is being prepared. This esterification reaction can be controlled so that one or more of the alcoholic hydroxyls are esterified. In general, these esterifications can be carried out by procedures well known to the art. The reaction temperature can be varied widely; with an acid halide or anhydride, temperatures in the neighborhood of 20-100° C. may be sufficient to produce esterification. The direct esterification with acid or the ester interchange process are preferably operated at temperatures above 100° C. and below 275° C.

A mixed ester can be prepared by reacting the polyhydric alcohol with the unsaturated acid, or an esterifiable derivative thereof, and with any monocarboxylic acid or esterifiable derivative thereof, simultaneously or successively, in any order. Where the other monocarboxylic acid is originally in the form of a drying or semi-drying oil, or other ester, it is sometimes most convenient first to prepare a partial ester (as, for example, linseed oil diglyceride) by alcoholysis and subsequently esterify the free hydroxyl groups present in this partial ester with the unsaturated benzoic acid. In such cases, a drying or semi-drying oil or other polyhydric alcohol ester is reacted with additional polyhydric alcohol, employing an alcoholysis catalyst such as litharge, sodium hydroxide, or sodium alcoholate in small amounts, suitably from 0.01-1.0%. The alcoholysis reaction can be carried out at temperatures of 150-300° C. The partially esterified polyhydric alcohol mixture is then reacted with the unsaturated benzoic acid or esterifiable derivative thereof.

The esterification procedures can be carried out in bulk—that is, without a solvent—or the solution method may be employed. In the latter method, an inert solvent is employed to carry out the by-product, such as water or methanol, from the reaction. Solvents and other details should be adjusted to the method chosen, the manner of so doing being apparent to anyone skilled in the art. When the solution method described in the examples is used, any inert liquid which dissolves the product is suitable, hydrocarbons being preferred. Suitable specific solvents include toluene, xylene, amyl benzene, tetrachloroethane, and cyclohexanone. The boiling point for the solvent is preferably in the range of 40-200° C.

Any polyhydric alcohol can be used in the preparation of the esters included in this invention. Suitable polyhydric alcohols include ethylene glycol, diethylene glycol, triethylene glycol, tetramethylene glycol, hexamethylene glycol, glycerol, erythritol, pentaerythritol, mannitol, methyltrimethylolmethane, and p,p'-di(2-hydroxyethyl)benzene.

The unsaturated benzoic acids employed in this invention can have one or more substitutents, but at least one of these must contain an ethylenically bonded carbon atom joined either directly to the benzoic acid residue or through an intervening carbonyl radical. The part of the molecule containing the ethylenically bonded carbon can be wholly aliphatic in character or can contain substituents of the class of aryl and heterocyclic groups. Substituents which are reactive under conditions of esterification with the carboxyl group, such as a hydroxyl, primary amino, secondary amino, sulfhydryl, or a second carboxyl, should not be present in the benzoic acid.

In addition to the acids disclosed in the examples, other suitable benzoic acids containing unsaturated substituents might include the following:

(1) 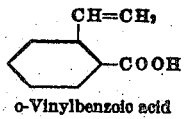
o-Vinylbenzoic acid

Ber. 26, abstract section, page 677 (1893).

(2) 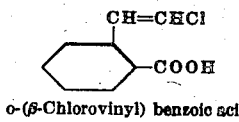
o-(β-Chlorovinyl) benzoic acid

Ber. 27, 2761 (1894). M. P. 151–152° C.

The following are additional unsaturated benzoic acids which are suitable for the practice of this invention:

aliphatic, open or closed chain, and if the latter, monocyclic or polycyclic, homocyclic or heterocyclic, saturated or unsaturated, straight or branched chain, and substituted or not by other groups or atoms such as a halogen which does not interfere with the esterification reaction. Specific acids that are suitable include cottonseed oil acids, corn oil acids, dehydrated castor oil acids, perilla oil acids, oiticica oil acids, linseed oil acids, soya bean oil acids, China-wood oil acids, quinolinic acid, crotonic acid, phenoxyacetic acid, stearic acid, rosin, and acidic natural resins.

In addition to the particular coating compositions of the examples, the esters of the present invention can be formulated into any other desired type of paint, varnish, lacquer, or enamel. Thus, they can be blended by conventional methods with other varnishes, varnish gums, such as Congo, kauri, ester gum, oil-soluble phenol-formaldehyde resins, rosin, and rosin-extended phenol-formaldehyde resins such as the "Amberols"; with other resins, such as the vinyl or urea-formaldehyde types; with cellulose deriva-

| | Acids | Mode of Preparation |
|---|---|---|
| (3) | CH₂=CH—CO—⌬—COOH | Formaldehyde+p-acetobenzoic acid. |
| (4) | CH₃—CH=CH—CO—⌬—COOH | Acetaldehyde+p-acetobenzoic acid. |
| (5) | CH₂=CH—CH=CH—CO—⌬—COOH | Acrolein+p-acetobenzoic acid. |
| (6) | CH₂=CH₂—CH=CH—CO—⌬—COOH | Methacrolein+p-acetobenzoic acid. |
| (7) | CH₃—CH=CH—CH=CH—CO—⌬—COOH | Crotonaldehyde+p-acetobenzoic acid. |
| (8) | CH₃—O—⌬—CH=CH—CO—⌬—COOH | p-Anisaldehyde+p-acetobenzoic acid. |
| (9) | CH₃—⌬—CH=CH—CO—⌬—COOH | p-Methylbenzaldehyde+p-acetobenzoic acid. |
| (10) | CH₂=CH—⌬—COOH | Hydrolysis of p-vinylbenzonitrile. |
| (11) | ⌬(CH=CHCO—CH₃)(COOH) | o-Carboxy benzaldehyde+acetone. |
| (12) | ⌬(CH=CH—CO—CH=CH—furyl)(COOH) | o-Carboxy benzaldehyde+acetone+furfural. |
| (13) | furyl—CH=CH—CO—⌬(COOH)(CO—CH=CH—furyl) | 2,4-diacetobenzoic acid+furfural. |

The monocarboxylic acid or acids for the preparation of the mixed esters, other than the unsaturated benzoic acids described above, can be any monocarboxylic acid in pure form or as acid mixtures. These acids can be aromatic or tives, such as nitrocellulose, cellulose acetate, cellulose propionate, or ethyl cellulose; and with auxiliary components of all kinds, such as waxes, solvents, pigments, and plasticizers, as needed and desired.

The polyhydric alcohol esters of this invention can be used in the preparation of polymeric products. For example, modified alkyd resins can be prepared with the use of these esters by reacting a mixed glyceride of linseed oil acids and p-cinnamoylbenzoic acid with glycerol until alcoholysis has taken place and subsequently reacting the free hydroxyl groups present in the mixture with phthalic anhydride. Other compositions and uses of the esters of this invention are described below.

These compositions can be applied to many kinds of surfaces and materials, such as wood, metal, paper, linen, silk, cotton, other textiles, and regenerated cellulose wrapping foils. Specific manufactures that can be so produced are linoleum, patent leather, linoxyn-type materials, oilcloth, oiled silk, printing inks, and sandpaper. The products of the invention can also be made up into molding compositions, putties, and the like. In addition, they can be employed as modifying agents for urea-formaldehyde and phenol-formaldehyde resins.

In particular, these esters are valuable substitutes for the natural drying oils in coating compositions, thereby reducing materially the dependence upon these natural products. The new esters have also many advantageous properties not shared by the natural oils, as, for example, the remarkable ability to form films which do not crystallize, wrinkle, or frost, as do films from the more rapidly drying natural oils, such as China-wood oil. Furthermore, it is possible to take any fatty oil, including one that has a low order of drying, and by substituting a part of the fatty acid making up that oil by an unsaturated benzoic acid, to improve the drying and film properties greatly.

It is apparent that many widely different embodiments of this invention may be made without departing from the spirit and scope thereof; and, therefore, it is not intended to be limited except as indicated in the appended claims.

I claim:

1. A polyhydric alcohol ester of a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

2. A glycerol ester of a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

3. A glycerol ester of p-cinnamoylbenzoic acid.

4. A glycerol ester of p-[β-(2-furyl)acrylyl] benzoic acid.

5. A glycerol ester of p-vinylbenzoic acid.

6. The method of making drying oils which comprises reacting together under ester forming conditions materials containing the radicals of a polyhydric alcohol and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

7. A polyhydric alcohol mixed ester of a monocarboxylic acid and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

8. A glycerol mixed ester of a monocarboxylic acid and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

9. A glycerol mixed ester of the acids of a natural fatty oil and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

10. A glycerol mixed ester of the acids of a natural drying oil and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

11. A glycerol mixed ester of linseed oil acids and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

12. The method of making drying oils which comprises reacting together under ester forming conditions materials containing the radicals of a polyhydric alcohol, a monocarboxylic acid, and a benzoic acid selected from the group which consists of those in which the carboxy aryl group is linked directly by a single bond to an ethylenically bonded carbon and those in which the carboxy aryl group is linked to an ethylenically bonded carbon through a carbonyl group.

13. A polyhydric alcohol mixed ester of a benzoic acid in which the carboxy aryl group is linked to an ethylenically bonded carbon through a carbonyl group.

14. A polyhydric alcohol mixed ester of a benzoic acid in which the carboxy aryl group is linked to an ethylenically bonded carbon through a carbonyl group that is para to the carboxy group.

MARTIN E. CUPERY.

REFERENCES CITED

The following references are of record in the file of this patent:

UNITED STATES PATENTS

| Number | Name | Date |
| --- | --- | --- |
| 1,213,330 | Betts | Jan. 23, 1917 |
| 2,099,455 | Strain | Nov. 16, 1937 |
| 2,151,185 | Carruthers | Mar. 21, 1939 |
| 2,160,532 | Barrett | May 30, 1939 |
| 2,188,885 | Clocker | Jan. 30, 1940 |
| 2,260,628 | Kyrides | Oct. 28, 1941 |
| 2,329,166 | Tucker | Sept. 7, 1943 |
| 2,381,868 | Agre | Aug. 14, 1945 |